United States Patent Office 3,302,048
Patented Jan. 31, 1967

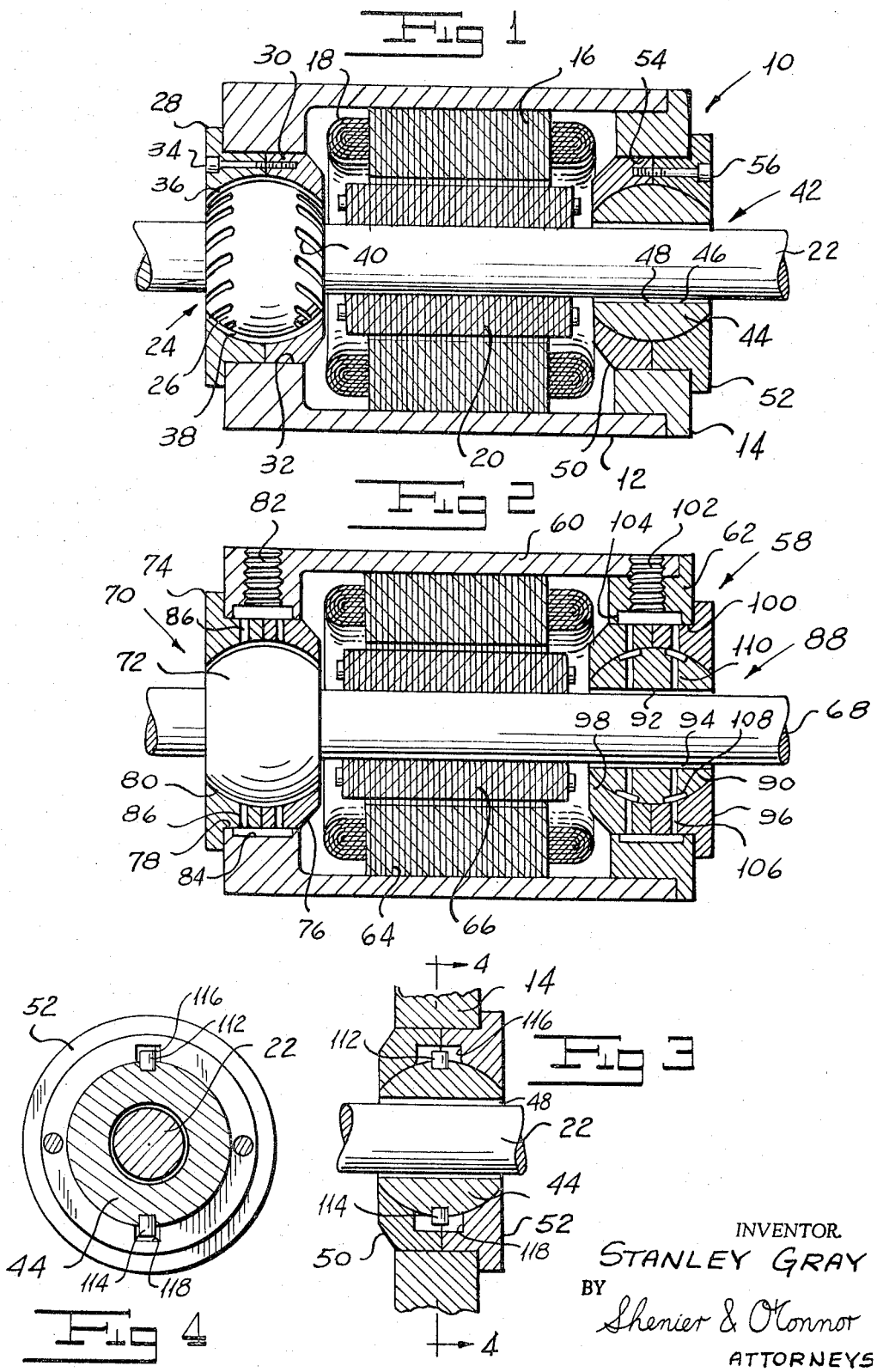

3,302,048
SELF-ALIGNING GAS BEARING
Stanley Gray, Loudonville, N.Y., assignor to The Barden Corporation, Danbury, Conn., a corporation of Connecticut
Continuation of application Ser. No. 315,183, Oct. 10, 1963. This application Sept. 23, 1965, Ser. No. 496,232
1 Claim. (Cl. 310—90)

This application is a continuation of my copending application Serial No. 315,183, filed October 10, 1963, now abandoned.

My invention relates to a self-aligning gas bearing assembly and more particularly to an inexpensive assembly of gas bearings adapted for use on low-cost, high-production devices.

There are known in the prior art gas bearings in which a film of gas is formed to support a rotating element. Bearings of this type have the advantages of long duty life, freedom from contamination such as occurs where liquid lubricants are employed, and adaptability to extreme temperatures. Owing to their construction, these bearings inherently require very close tolerances on clearance, parallelism, squareness and alignment. As a result of these requirements, such bearings have been employed in the prior art only in expensive installations such as precision equipment.

It is desirable that the advantages of gas bearings could be built into low-cost, mass-produced rotating equipment such, for example, as electric motors and the like. As a practical matter, such low-cost, mass-produced equipment is manufactured and assembled with greater inaccuracies of fit, alignment, squareness and the like than can be tolerated in gas bearings of the type known in the prior art. If an attempt were made to employ conventional gas bearings on such a device, either the bearings would lock up or it would be necessary to use tolerances which were so great that the bearing performance would be lost.

I have invented a gas bearing assembly which is adapted for use on low-cost, mass-produced equipment. My gas bearing assembly can accommodate the inaccuracies of manufacture of mass-produced equipment while retaining all of the advantages of conventional gas bearings. My bearing assembly is relatively inexpensive as compared with conventional gas bearing assemblies of the prior art. My bearing assembly can be produced from standardized components. It is self-aligning.

One object of my invention is to provide a gas bearing system which is self-aligning.

Another object of my invention is to provide a gas bearing system which is adapted for use on low-cost, mass-produced devices.

Yet another object of my invention is to provide a gas bearing system which can accommodate the inaccuracies of mass-produced devices while retaining the advantages of gas bearings.

A further object of my invention is to provide a gas bearing system which is relatively inexpensive.

A still further object of my invention is to provide a gas bearing system which can be commercially produced by relatively unskilled labor in standardized sizes.

Other and further objects of my invention will appear from the following description.

In general, my invention contemplates the provision of a self-aligning low-cost gas bearing system for supporting a rotating member in which I dispose a spherical gas bearing at one point along the shaft of the rotating member. I dispose a straight cylindrical gas bearing at a second point along the shaft spaced from the first point. I form the straight cylindrical gas bearing in a spherical mounting assembly to permit movement of the shaft around an axis perpendicular to its longitudinal axis to accommodate misalignment of parts.

In the accompanying drawings which form part of the instant specification and which are to be read in conjunction therewith and in which like reference numerals are used to indicate like parts in the various views:

FIGURE 1 is a sectional view of a rotating device provided with a hydrodynamic or self-acting form of my gas bearing system.

FIGURE 2 is a sectional view of a rotating device provided with a hydrostatic or pressurized form of my gas bearing system.

FIGURE 3 is a fragmentary sectional view illustrating a modified support arrangement for the cylinder gas bearing of my system.

FIGURE 4 is an elevation of the support assembly shown in FIGURE 3 taken along the line 4—4 of FIGURE 3.

Referring now to FIGURE 1 of the drawings, my gas bearing system may be used on a rotating device such, for example, as an electric drive motor, indicated generally by the reference character 10, having a case 12, one end of which is closed by an end plate 14. The electric motor 10 includes a stator 16 having windings 18 and a rotor 20 carried by a shaft 22.

I provide the electric motor 10 with a hydrodynamic or self-acting spherical gas bearing, indicated generally by the reference character 24, adjacent one end of the armature 20. The bearing 24 comprises a spherical member 26 fixed to the shaft 22 by any suitable means known to the art such, for example, as a force fit. The sphere 26 is disposed in a bearing housing comprising housing halves 28 and 30. These housing halves are received in an opening 32 in the housing 12 and are held in assembled relationship by any suitable means such as by a screw 34. The halves 28 and 30 together form a spherical surface 36 which cooperates with the sphere 26 to define a space 38 in which the gas film is formed. As shaft 22 rotates a supporting film of the ambient gas forms in the space 38. It will be appreciated that there must be an ambient gas for the film to form. The load which can be supported is determined in part by the pressure of the ambient gas.

I provide the sphere 26 with a plurality of grooves 40 or the like which generate pressure as the shaft 22 rotates. It is to be noted that the grooves 40 are so oriented with respect to the direction of motor rotation as to generate the correct pressures to resist axial loads. It will readily be apparent that the spherical bearing 24 resists both a radial load and a thrust load in either direction with reference to the axis of shaft 22.

I form a straight cylinder gas bearing, indicated generally by the reference character 42, at the end of the armature 20 remote from the spherical bearing 24. The bearing 42 is made up by a spherical member 44 provided with a central bore 46 which cooperates with shaft 22 to define a narrow cylindrical space 48 in which the gas film of the radial bearing forms. I support the sphere 44 within a two-piece housing comprising housing halves 50 and 52 disposed in an opening 54 in end plate 14 and secured in assembled relationship by suitable means such as a screw 56. Owing to the fact that it need absorb no axial or thrust load bearing 42 need not be secured to the assembly. Leaving it free permits gross thermal distortion as well as movement of parts during operation of the supported device.

It will readily be apparent that the bearing 42 and its supporting structure cooperate with the spherical bearing 24 to accommodate any misalignment of parts resulting from manufacture. Moreover, the position of the shaft 22 axially with respect to the bearing 42 is of little significance with the result that center distance errors or changes in center distances due to thermal movement do not deleteriously affect the performance of my bearing system. At the same time, the bearing 24 resists thrust loads in both directions.

Referring now to FIGURE 2 of the drawings, I have shown an alternate embodiment of my gas bearing system installed on an electric motor indicated generally by the reference character 58. This motor includes a housing 60 provided with an end plate 62 and including a stator 64 and a rotor 66 carried by a shaft 68.

I provide a hydrostatic or pressurized spherical gas bearing indicated generally by the reference character 70 for shaft 68 at one end of the armature 66. Bearing 70 includes a sphere 72 secured to the shaft 68 in any appropriate manner. Respective housing halves 74 and 76 are disposed in an opening 78 in the end of housing 60 and are held in assembled relationship by any suitable means. Housing halves 74 and 76 cooperate with the sphere 72 to define a gas film space 80. In this hydrostatic bearing I supply gas under pressure through a conduit 82 to an annular space 84 around the housing formed by members 74 and 76. A plurality of passages 86 conduct gas from the space 84 to the space 80.

I dispose a straight cylinder gas bearing, indicated generally by the reference character 88, on shaft 68 adjacent the other end of the armature 66. The bearing 88 comprises a spherical member 90 formed with a bore 92 which cooperates with the shaft 68 to form a cylindrical space 94 for the gas film. Respective housing halves 96 and 98 are held in assembled relationship and disposed in an opening 100 in plate 62. A passage 102 leads to an annular space in the space 104 in the plate opening 100. Passages 106 in the housing halves 96 and 98 connect the space 104 to annular spaces 108 in the periphery of the member 90. Passages 110 connect the spaces 108 to the space 94. It is to be noted that the spaces 108 are sufficiently wide to permit them to accommodate some rotary movement of the member 90. When gas under pressure is fed to the inlet 102, it flows around the space 104 through passages 106 to the spaces 108 and thence through passages 110 to the space 94 to provide the film required for the bearing. It will readily be understood that while I have shown one form of my system in which I employ hydrodynamic or self-acting bearings and another form of my invention in which I employ hydrostatic or pressurized bearings, it will be appreciated that I may employ a combination of the two.

I may, as shown in FIGURE 1, lock the spherical mounting comprising members 50 and 52, for example, during the assembly of the device. Alternatively, I may employ an unlocked arrangement such as is illustrated in FIGURE 3. In this form of mounting, I treat the face of the spherical member 44 and the faces of members 50 and 52 with an anti-fretting and low friction treatment. Respective pins 112 and 114 in the spherical member 44 are disposed in recesses 116 and 118 formed by the members 50 and 52. These pins cooperate with the recesses to limit the rotary movement of the spherical member 44.

While I have shown and described my gas bearing assembly in use on an electric motor, it will be appreciated that it is applicable to many drives including electric motors and turbines and the like.

In operation of the form of my gas bearing assembly shown in FIGURE 1, in response to the electric supply, shaft 22 and armature 20 rotate. As the device builds up to speed, a film of gas builds up in the space 38 and in the space 48. After the film has thus built up, the spherical bearing 24 resists axial or thrust loads in both directions, as well as radial loads. The cylindrical bearing 42 resists only radial loads. Owing to the fact that the cylindrical bearing 42 is formed in part by the spherical member 44, the bearing arrangement can tolerate misalignment of the shaft 22 without interfering with the operation of the gas bearing system. Since the cylindrical bearing 42 is required to absorb only radial load and no thrust loads, the tolerances in the direction of the axis of shaft 22 need not be close.

The operation of the form of my invention shown in FIGURE 2 is similar to that of the device shown in FIGURE 1 with the exception that I supply the gas under pressure to the spherical bearing 70 and to the cylindrical bearing 88. The gas passes through an opening 82 into an annular space 84 and through passages 86 to the film-forming space 80. Gas passes through the passage 102 into an annular space 104 and from this space through passages 106 and into the spaces 108. From spaces 108 the gas is conducted to the film-forming space 94 by passages 110. It will readily be apparent that the spaces 108 are substantially wider than are the passages 106 so as to permit misalignment of the shaft without interrupting the flow of gas to the space 94.

If desired, I may employ pins 112 and 114 for cooperation with recesses 116 and 118 to limit the rotary movement of the member 44.

It will be seen that I have accomplished the objects of my invention. I have provided a gas bearing assembly which is adapted for use on low-cost, mass-produced devices. My arrangement can accommodate the inaccuracies inherent in mass-produced devices without detracting from the performance of gas bearings. My arrangement is relatively inexpensive and may be commercially produced by relatively unskilled labor in standardized sizes.

It will be understood that certain features and subcombinations are of utility and may be employed without reference to other features and subcombinations. This is contemplated by and is within the scope of my claim. It is further obvious that various changes may be made in details within the scope of my claim without departing from the spirit of my invention. It is, therefore, to be understood that my invention is not to be limited to the specific details shown and described.

Having thus described my invention, what I claim is:

A hydrodynamic bearing assembly including in combination, an elongated housing having ends, a winding carried by said housing intermediate its ends, a shaft having an axis, a rotor carried by said shaft for coaction with said winding, a first spherical bearing element, means for securing said first bearing element to said shaft for rotation therewith, a first pair of spherical surface forming elements, means mounting said first spherical surface forming elements in assembled relationship at one end of said housing to receive said first spherical bearing element, said bearing element and the surface formed by the first pair of elements cooperating to provide a spherical hydrodynamic gas lubricant film forming space, a second bearing element having a cylindrical bore and a spherical outer surface, a second pair of spherical surface forming elements, means mounting said second pair of elements at the other end of said housing, said shaft being positioned in said bore to form a hydrodynamic spherical gas bearing therewith, and means for locking said spherical surface forming elements in engagement with said second spherical element in a position thereof at which said cylindrical bore is aligned with said shaft axis to prevent movement of said second bearing element with relation to said second pair of spherical surface forming elements.

References Cited by the Examiner

UNITED STATES PATENTS

| | | | |
|---|---|---|---|
| 1,562,130 | 11/1925 | Stitzinger | 308—72 |
| 2,479,349 | 8/1949 | Hagg | 308—240 |
| 2,998,999 | 9/1961 | Morser et al. | 308—122 |
| 3,044,838 | 7/1962 | Winer et al. | 308—122 |
| 3,174,811 | 3/1965 | Schmidt et al. | 308—72 |

MARTIN P. SCHWADRON, *Primary Examiner.*

FRANK SUSKO, DAVID J. WILLIAMOWSKY,
*Examiners.*